Patented Aug. 31, 1954

2,687,999

UNITED STATES PATENT OFFICE 2,687,999

TREATMENT OF AQUEOUS LIQUORS CONTAINING THIOCYANATES

Hugh Randall Bott and Henry Michael Spiers, London, England, assignors to The Permutit Company Limited, London, England, a British company, Stewarts & Lloyds Limited, Glasgow, Scotland, a British company, and The Woodall-Duckham Vertical Retort and Oven Construction Company (1920) Limited, London, England, a British company No Drawing. Application March 26, 1951, Serial No. 217,681

Claims priority, application Great Britain March 31, 1950

7 Claims. (Cl. 210—24)

This invention relates to processes for removing thiocyanate from industrial aqueous liquors such as gasworks effluents.

It is well known that such effluents cannot be discharged into streams without treatment but rather must first be purified. This purification can be effected by anion-exchange as described in British patent specification No. 592,767. Hitherto the process has been carried out by passing the liquor to be treated through a bed of an anion-exchange material containing replaceable mineral acid anions to bring about exchange of these for the thiocyanate ions, the process depending on the fact that the anions of thiocyanates are taken up in preference to the anions of mineral acids. Since the usual process depends on this preferential exchange, the complete cycle (so far as the bed is concerned) comprises three exchange stages instead of the two (working stage and regeneration) usual in ion-exchange processes, that is to say, the thiocyanate must be removed from the bed by treatment of the bed with ammonia or other alkali and thereafter the bed must be treated with a mineral acid to make it ready for re-use.

Now this process is satisfactory when there are no large concentrations of other anions also present in the liquor, as then the majority of the anions taken up from the mineral acid will be exchanged for the anions of the thiocyanate. However, most gasworks effluents contain substantial quantities of other anions, e. g. chloride ions. As a result of the presence of these, the anion-exchange reaction which takes place when the liquor is passed through the bed cannot proceed very far, with the result that only a small part of the chloride (or other mineral acid) anions taken up by the anion-exchange material has been exchanged by the time that thiocyanate appears in the effluent liquor. Accordingly, when the bed is regenerated by successive treatments with ammonia and hydrochloric acid, most of the ammonia serves only to remove unexchanged chloride ions and only a small amount is used to remove thiocyanate; this is wasteful both in hydrochloric acid and in ammonia, although the ammonia can be recovered for re-use.

The principal object of this invention is to provide an improved ion-exchange process for the removal of thiocyanate from industrial liquors.

Another object is to reduce the quantity of regenerant required in processes in which anion-exchange materials are used for thiocyanate removal.

Yet another object is to increase the concentration of thiocyanate in a liquid for disposal.

The present invention is dependent on the peculiar properties of anion-exchange materials, which differ considerably in their ability to exchange anions. Some, e. g. those prepared by the condensation of aniline derivatives or meta-phenylene diamine which formaldehyde, are so weakly basic that when activated with an alkali they have substantially no power of taking up the anion of salts, but only those of acids. Others, e. g. those formed by chloromethylating and then aminating co-polymers of styrene and di-vinyl benzene, are so strongly basic that when activated with a strong alkali they become charged with hydroxyl ions and then will take up practically every anion in a liquid. These materials also possess the characteristic that, when they are substantially exhausted, they cannot be regenerated with ammonia but only with a stronger alkali. A third class, exemplified by the condensation product of a polyalkylene-polyamine and phenol, acetone or melamine with formaldehyde, is capable both (when charged with hydroxyl ions) of exchanging these for the anions of ammonium chloride and (when exhausted) of being regenerated with ammonia.

We have now found that if the liquor to be treated is passed through a bed of an anion-exchange material of this third class charged with hydroxyl ions there is a preferential removal of thiocyanate ions and the liquor emerging from the anion-exchange material is low in or substantially free from thiocyanate ions, while the other anions present in it largely pass through the bed unchanged. Furthermore, by reducing the pH of the liquor before passing it through the bed, we can increase the proportion of thiocyanate anions to other anions taken up by the anion-exchange material. The pH reduction can be effected by adding mineral acid to the liquor and the amount of acid used for this purpose is very much less than the amount of acid required in the regeneration of a bed which is charged with mineral acid anions during the stage of thiocyanate removal. When the thiocyanate content of the effluent liquor changes in the process according to the invention, i. e. either thiocyanate appears in the effluent or the thiocyanate content begins to rise, the flow is stopped and the bed is regenerated by treatment with an alkali, which may be an aqueous solution of ammonia, e. g. a 12% solution. A dilute solution of caustic soda or sodium carbonate may be used as the alkali instead of ammonia.

After passage of this solution through the bed, the excess ammonia is washed away from the bed with water and the bed is then ready to treat a fresh quantity of liquor.

By this process the amount of alkali required for regeneration of the bed for a given amount of thiocyanate removed from the liquor is considerably less than in the process used hitherto as described in British specification No. 592,767, because it is dependent only on the quantity of anions removed from the liquor during the treatment and not on the much greater quantity of mineral acid anions put into the bed in the regeneration stage of the process described in British specification No. 592,767.

Generally, the object of the process is twofold, namely to purify the liquor to such an extent that it can be discharged into a stream and to collect the thiocyanate in as high a concentration as possible for disposal by combustion or otherwise. In carrying out the invention, therefore, we pass the liquor to be treated, with or without previous pH reduction, through a bed of anion-exchange material charged with exchangeable hydroxyl ions, the flow is stopped when the thiocyanate content of the effluent changes, an alkaline solution is passed through the bed to displace the thiocyanate ions taken up by the bed, the effluent containing these ions is collected for disposal, and the bed is washed with water and used for the treatment of further liquor.

Not only is there a substantial saving in regenerant, but also the amount of liquor containing thiocyanate that must be disposed of is reduced. The reason is that as less regenerant has to be passed through the bed in the step of displacing thiocyanate, the resultant effluent is of smaller volume and therefore more easily disposed of. This is a substantial advantage.

The actual capacity of the bed for the removal of thiocyanate is another important factor. As explained above, it is necessary to ensure that the thiocyanate content of the purified effluent is low. Since, however, there is very considerable dilution when the effluent enters a stream, it is not always necessary to ensure that at no instant does the thiocyanate content of the effluent rise above a specific value; rather it is enough to ensure that over a period of time the total amount of thiocyanate discharged into the stream is not too high. For this reason, the limiting factor which determines when the ion-exchange material must be regenerated is the thiocyanate content of the total purified effluent, which may conveniently be described as the bulk effluent. A practical upper limit for this content is 30 p. p. m. In other words, if all the effluent during the working run (in which thiocyanate is taken up by the ion-exchange material) is collected, the run must be stopped when the thiocyanate content of this collected or bulk effluent reaches 30 p. p. m. The volume of the bulk effluent is therefore a measure of the capacity of the bed.

In any ion-exchange process an increase in capacity is desirable because it allows more liquid to be treated between regenerations, but in the treatment of liquors containing thiocyanate the increase is doubly important because it is found that the efficiency of the regeneration increases with the capacity and so the ratio of treated liquor to regenerant increases also. This means that the ratio of the volume of effluent in the regenerating stage to the volume of treated liquor is reduced, so that for a given volume of treated liquor the volume of concentrated thiocyanate is further reduced and therefore more easily disposed of.

In general, any thiosulphate will behave in the same way as thiocyanate, and the references made above and in the claims to thiocyanate include any thiosulphate present. However, with some liquors the thiosulphate content of the effluent is found to be higher than is desirable while the thiocyanate content has been satisfactorily reduced. In such a case the effluent may be passed through a bed of anion-exchange material which has been successively regenerated with an alkali and an acid.

To show the improvement brought about by means of the invention, some experimental results will be given. In each of the experiments use was made of a bed of anion-exchange resin which had been made by the condensation of tetraethylene-pentamine with phenol and formaldehyde. The bed was used for treating a liquor containing 150 p. p. m. of CNS and 110 p. p. m. of $S_2O_3$ (as ammonium salts) together with 0.4% ammonium chloride. The effluents were collected and tested for thiocyanate, the runs being stopped when the thiocyanate concentration in the bulk effluent reached 30 p. p. m. In each case, when a volume of bulk effluent had been found, the minimum amount of regenerant which yielded this volume of bulk effluent was also determined.

*Example 1*

In one set of experiments the bed had a volume of 1 cubic foot. First it was activated by the standard process used hitherto, being treated first with 9.3 lbs. of ammonia in the form of a 12% solution, and secondly with 13.3 lbs. of sulphuric acid in the form of a 5% solution. The volume of the bulk effluent was 368 gallons. When the bed was used in the alkali-regenerated state the regenerant required to give a bulk effluent of 368 gallons was only 5.6 lbs. of ammonia in the form of a 12% solution. When the liquor was acidified with 0.83 lb. of sulphuric acid, the regenerant required for the same bulk effluent was 5.0 lbs. of ammonia used as a 12% solution.

In each of the processes of this example the ratio of the volume of the bulk effluent to that of the effluent collected during the passage of the ammonia through the bed (the effluent containing thiocyanate for disposal) was also determined. It was 48:1 in the standard process, 90:1 when the bed was used in the alkali-regenerated state, and 95:1 when the liquor was acidified.

*Example 2*

With the conditions otherwise the same as in Example 1, sodium hydroxide was used instead of ammonia. The same volume of bulk effluent was obtained, and in the standard process 20 lbs. of sodium hydroxide as a 12% solution were required together with 13.3 lbs. of sulphuric acid in the form of a 5% solution. When the bed was used in the alkali-regenerated state the regenerant required was 13.5 lbs. of sodium hydroxide in the form of a 12% solution. When the liquor was acidified with 0.83 lb. of sulphuric acid, 12 lbs. of sodium hydroxide as a 12% solution were required. The ratios of the volumes of treated effluent to those of regenerant liquor for disposal in the three cases were 20:1, 36:1 and 33:1 respectively.

Example 3

Example 1 was repeated using hydrochloric acid instead of sulphuric acid. In the standard process 600 gallons of collected effluent were obtained and 7.5 lbs. of ammonia as a 12% solution together with 9.5 lbs of hydrochloric acid (calculated as HCl) as a 3% solution were required. When the bed was used in the alkali-regenerated state, and the liquor was acidified with 0.6 lb. of hydrochloric acid, 368 gallons of effluent were obtained and the regenerant required was 5.0 lbs. of ammonia as a 12% solution. The ratios of collected effluent to liquor disposed of were 95:1 and 90:1 respectively.

We claim:

1. A process for the treatment of an aqueous industrial liquor containing thiocyanate salts and other salts, comprising contacting said liquor with an alkali-activated anion-exchange material capable when charged with hydroxyl ions of exchanging these for the anions of ammonium chloride and when exhausted of being regenerated with ammonia.

2. In the treatment of an aqueous industrial liquor containing thiocyanate salts and other salts, the steps of establishing a bed of anion-exchange material capable when charged with hydroxyl ions of exchanging these for the anions of ammonium chloride and when exhausted of being regenerated with ammonia, passing said liquor through said bed while said bed is in the alkali-regenerated state, and regenerating said bed from time to time with an alkaline solution.

3. A process for the treatment of an aqueous industrial liquor containing thiocyanate salts and other salts, comprising reducing the pH of said liquor and thereafter passing said acidified liquor containing thiocyanate salts and other salts through an alkali-activated bed of anion-exchange material capable when charged with hydroxyl ions of exchanging these for the anions of ammonium chloride and when exhausted of being regenerated with ammonia.

4. A process for the treatment of an aqueous industrial liquor containing thiocyanate salts and other salts comprising passing said liquor through an alkali-activated bed of anion-exchange material capable when charged with hydroxyl ions of exchanging these for the anions of ammonium chloride and when exhausted of being regenerated with ammonia, stopping the flow through said bed when the thiocyanate content of the effluent therefrom changes, passing an alkaline solution through said bed whereby thiocyanate ions taken up by said bed are displaced, collecting the effluent containing these ions for disposal, washing said bed with water and using said alkali-regenerated and washed bed for the treatment of further liquor.

5. A process for the treatment of an aqueous industrial liquor containing thiocyanate salts and other salts, comprising contacting said liquor with an alkali-activated anion-exchange condensation product of a polyalkalene-polyamine, formaldehyde, and at least one member selected from the group consisting of phenol, acetone and melamine.

6. A process for the treatment of an aqueous industrial liquor containing thiocyanate salts and other salts which comprises adding an acid thereto to acidify the liquor and then passing the acidified liquor through an alkali activated bed of an anion exchange material which material is capable when charged with hydroxyl ions of exchanging these for the anions of ammonium chloride and when exhausted of being regenerated with ammonia.

7. A process according to claim 4, comprising in addition reducing the pH of said liquor and then passing said liquor of reduced pH containing thiocyanate salts and other salts through the bed.

References Cited in the file of this patent

UNITED STATES PATENTS

| Number | Name | Date |
|---|---|---|
| 2,259,169 | Little | Oct. 14, 1941 |
| 2,442,989 | Sussman | June 8, 1948 |

FOREIGN PATENTS

| Number | Country | Date |
|---|---|---|
| 52,767 | Great Britain | Sept. 29, 1947 |